(12) United States Patent
Granato, Jr. et al.

(10) Patent No.: US 9,839,969 B2
(45) Date of Patent: *Dec. 12, 2017

(54) SYSTEMS AND METHODS FOR WIRE FEED SPEED CONTROL

(71) Applicant: ILLINOIS TOOL WORKS INC., Glenview, IL (US)

(72) Inventors: John Carmen Granato, Jr., Greenville, WI (US); Chris John Roehl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,661

(22) Filed: Feb. 29, 2016

(65) Prior Publication Data

US 2016/0175973 A1 Jun. 23, 2016

Related U.S. Application Data

(63) Continuation of application No. 14/066,192, filed on Oct. 29, 2013, now Pat. No. 9,272,357, which is a continuation of application No. 12/748,268, filed on Mar. 26, 2010, now Pat. No. 8,569,654.

(60) Provisional application No. 61/186,177, filed on Jun. 11, 2009.

(51) Int. Cl.
| | |
|---|---|
| *B23K 9/12* | (2006.01) |
| *B23K 9/173* | (2006.01) |
| *B23K 9/095* | (2006.01) |

(52) U.S. Cl.
CPC .............. *B23K 9/124* (2013.01); *B23K 9/095* (2013.01); *B23K 9/173* (2013.01)

(58) Field of Classification Search
CPC ..................................................... B23K 9/121
See application file for complete search history.

(56) References Cited

U.S. PATENT DOCUMENTS

| | | |
|---|---|---|
| 2,424,324 A | 7/1947 | Murcek |
| 3,125,671 A | 3/1964 | Manz |
| 3,555,239 A | 1/1971 | Kerth |

(Continued)

FOREIGN PATENT DOCUMENTS

| | | |
|---|---|---|
| DE | 9301390 | 4/1993 |
| DE | 19733638 | 2/1999 |

(Continued)

OTHER PUBLICATIONS

Lincoln Electric, Magnum SG Spool Gun Operator's Manual, Lincoln Global Inc., IM408, Feb. 2005 pp. 1-15.*

(Continued)

*Primary Examiner* — Harry W Byrne
*Assistant Examiner* — R Lance Reidlinger
(74) *Attorney, Agent, or Firm* — McAndrews, Held & Malloy, Ltd.

(57) ABSTRACT

A welding system including a fine tuning knob and a coarse adjustment knob for setting a weld wire feed speed are provided. The welding system may include a welder having the coarse adjustment knob and a spool gun having the fine tuning knob. A user may adjust the knob on the welder to set a coarse adjustment wire feed speed and may adjust the knob on the spool gun to fine tune the wire feed speed setting.

20 Claims, 6 Drawing Sheets

(56) References Cited

U.S. PATENT DOCUMENTS

| | | | |
|---|---|---|---|
| 4,093,844 A | 6/1978 | Fellure |
| 4,438,317 A | 3/1984 | Ueguri |
| 4,510,373 A | 4/1985 | Cox |
| 4,608,482 A | 8/1986 | Cox |
| 4,721,947 A | 1/1988 | Brown |
| 4,954,690 A | 9/1990 | Kensrue |
| 4,973,821 A | 11/1990 | Martin |
| 5,043,554 A | 8/1991 | Kohsaka |
| 6,166,350 A | 12/2000 | Sickels |
| 6,225,599 B1 | 5/2001 | Altekruse |
| 6,476,354 B1 | 11/2002 | Jank |
| 6,590,184 B1 | 7/2003 | Andersen |
| 6,930,280 B2 | 8/2005 | Zauner |
| 7,244,908 B2 | 7/2007 | Ward |
| 8,546,728 B2 | 10/2013 | Sickels |
| 8,569,654 B2 | 10/2013 | Granato, Jr. |
| 9,272,357 B2 | 3/2016 | Granato |
| 2001/0047987 A1 | 12/2001 | Nowak |
| 2004/0004064 A1 | 1/2004 | Lanouette |
| 2004/0020911 A1 | 2/2004 | Centner |
| 2004/0095704 A1 | 5/2004 | Cigelske |
| 2004/0099648 A1 | 5/2004 | Hu |
| 2004/0129759 A1 | 7/2004 | Rouault |
| 2004/0173591 A1 | 9/2004 | Knoener |
| 2004/0226930 A1 | 11/2004 | Radtke |
| 2005/0016979 A1 | 1/2005 | Stein |
| 2005/0045608 A1 | 3/2005 | Sykes |
| 2005/0045611 A1 | 3/2005 | Ihde |
| 2005/0161448 A1 | 7/2005 | Stava |
| 2005/0173393 A1 | 8/2005 | Nowak |
| 2005/0218129 A1 | 10/2005 | Kensrue |
| 2006/0207981 A1* | 9/2006 | Diekmann | B23K 9/1336 219/137.2 |
| 2006/0219683 A1 | 10/2006 | Kensrue |
| 2007/0158313 A1 | 7/2007 | Stanzel |
| 2007/0181553 A1 | 8/2007 | Stanzel |
| 2008/0208387 A1 | 8/2008 | DiVenere |

FOREIGN PATENT DOCUMENTS

| | | |
|---|---|---|
| EP | 0901865 | 3/1999 |
| EP | 0987079 | 3/2000 |
| EP | 1445055 | 8/2004 |
| EP | 1512480 | 3/2005 |
| EP | 1559496 | 8/2005 |
| FR | 2836641 | 9/2003 |

OTHER PUBLICATIONS

Lincoln Electric, IDEALARC SP255 Operator's Manual, IM533, Jun. 1998, pp. A1-F3.*

International Search Report for application No. PCT/EP2010/035977 dated Sep. 7, 2010.

* cited by examiner

SYSTEMS AND METHODS FOR WIRE FEED SPEED CONTROL

CROSS REFERENCE TO RELATED APPLICATIONS

This application is a Continuation of U.S. patent application Ser. No. 14/066,192, filed Oct. 29, 2013, entitled "Systems and Methods for Wire Feed Speed Control" in the name of John Carmen Granato, Jr. et al., which is a Continuation of U.S. patent application Ser. No. 12/748,268, filed Mar. 26, 2010, entitled "Systems and Methods for Wire Feed Speed Control" in the name of John Carmen Granato, Jr. et al., which issued as U.S. Pat. No. 8,569,654 on Oct. 29, 2013, which is a Non-Provisional Patent Application of U.S. Provisional Patent Application No. 61/186,177, entitled "Spool Gun Autoset Feature", filed Jun. 11, 2009, all of which are herein incorporated by reference in their entireties for all purposes.

BACKGROUND

The invention relates generally to welding systems, and, more particularly, to wire feed speed control systems and methods.

Welding is a process that has increasingly become ubiquitous in various industries and applications. While such processes may be automated in certain contexts, a large number of applications continue to exist for manual welding operations. Such welding operations rely on a variety of control schemes to ensure the supply of welding consumables (e.g., wire feed, shielding gas, etc.) is provided to the weld in an appropriate amount at the desired time. For example, metal inert gas (MIG) welding relies on a proper wire feed speed to prevent weld splatter and arc outage.

To ensure that the wire feed speed is properly set for a given welding application, so-called "auto-set" welding systems have been developed. These systems provide greatly enhanced convenience by automatically setting certain parameters, such as wire feed speed, depending upon a simple user selection of a type of welding wire being used. However, such systems are often limited by substantial tolerances between motors on comparable spool guns. Such limitations may lead to welding under non-optimal conditions due to wire feed speeds that are outside the optimal range for the given welding operation, owing to the natural tolerances of the wire drive motors (and related components). Moreover, in such auto-set arrangements, and in conventional systems where an operator sets the desired wire feed speed, there is typically little or no ability to "fine tune" the wire feed speed actually obtained. Accordingly, there exists a need for systems that address such shortcomings.

BRIEF DESCRIPTION

In an exemplary embodiment, a welding system is provided that includes a welding power supply including a first input configured to be adjusted by an operator to set a first wire feed speed parameter. The welding system also includes a spool gun adapted to be coupled to the welding power supply and having a second input configured to be adjusted by an operator to set a second wire feed speed parameter. One of the first wire feed speed parameter and the second wire feed speed parameter is a coarse adjustment and the other one of the first wire feed speed parameter and the second wire feed speed parameter is a fine adjustment.

In another embodiment, a welding system is provided that includes a welding power supply having a control panel having a first potentiometer configured to be adjusted by an operator to choose a first feature or a second feature. The power supply is adapted to enter an auto-set mode when the first feature or the second feature is chosen by the operator. The welding system also includes a spool gun having a second potentiometer configured to be adjusted by an operator to fine tune a coarse wire feed speed set by the auto-set mode of the welding power supply.

In another embodiment, a controller for a welding system is provided. The controller is configured to receive a first input from a first potentiometer located on a welding power supply. The controller is further configured to receive a second input from a second potentiometer located on a spool gun, wherein one of the first input and the second input is a coarse adjustment setting for a wire feed speed and the other one of the first input and the second input is a fine adjustment setting for the wire feed speed. The controller is also configured to output a signal to a motor control board that is configured to adjust the wire feed speed of a wire spool according to the first input and the second input.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments are provided of a welding system including a fine tuning adjustment and a coarse adjustment for setting a weld wire feed speed. In one embodiment, the welding system may include an auto-set mode capable welder having the coarse adjustment based on a user selected wire type, and a spool gun having the fine tuning adjustment. In such an embodiment, the user may trigger an onset of the auto-set mode by rotating a coarse adjustment knob to a weld wire diameter panel. If an auto-set feature is provided, the welder then determines an appropriate coarse wire feed speed output based on the input weld wire diameter and material thickness. The user may then adjust a fine tuning knob located on the spool gun to fine tune the wire feed speed. That is, the user may adjust a knob or other input device on the welder to set a coarse adjustment wire feed speed and then adjust another input device on the spool gun to fine tune the wire feed speed setting. Such embodiments may offer advantages over traditional systems that allow the user to adjust a coarse wire feed speed, typically a single adjustment, via a knob located on the spool gun. For example, because the tolerance (i.e., rotational speed versus input command signal) between spool gun motors can often be significant, traditional systems may make it difficult for an operator to achieve an optimal wire feed speed by adjusting a coarse knob on the spool gun. Embodiments of the present invention, however, may facilitate achievement of an optimal wire feed speed setting since the coarse adjustment may be located on the welder, and a fine tuning adjustment may be located on the spool gun.

Figure 1:
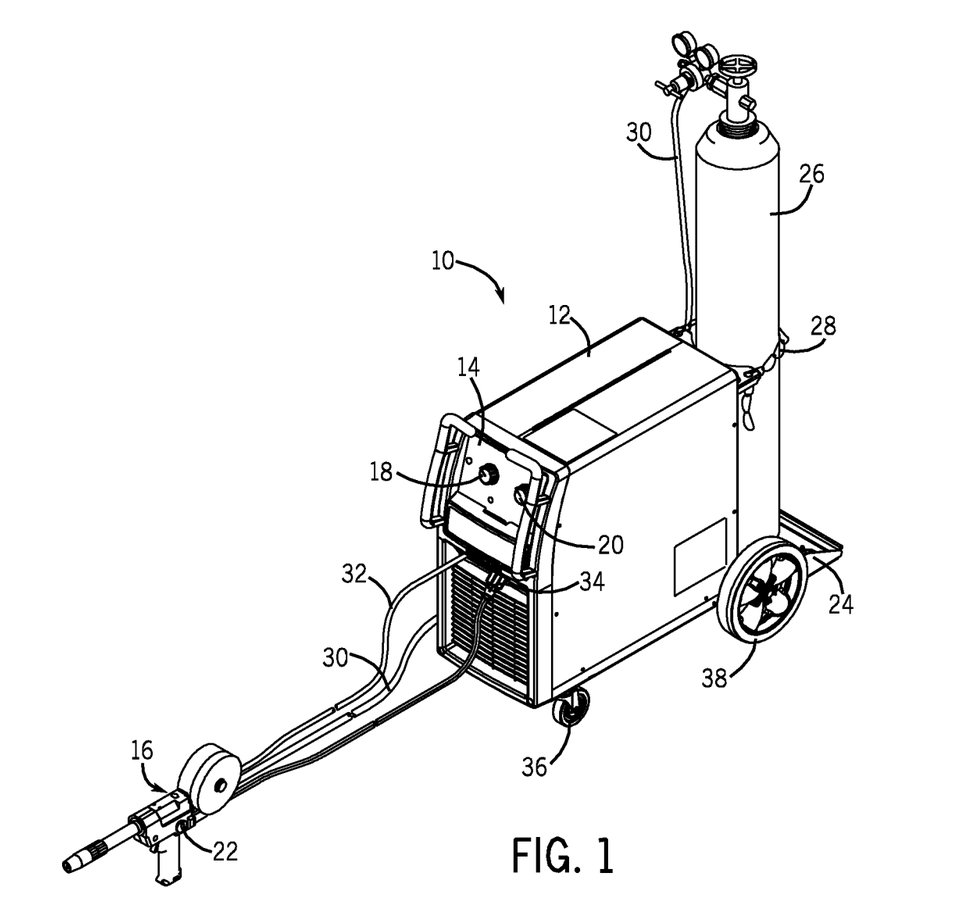
FIG. 1 is a perspective view of an exemplary welding system including a welder with a coarse wire feed speed adjustment and a spool gun with a fine adjustment in accordance with aspects of the present invention.

Turning now to the drawings, FIG. 1 illustrates an exemplary welding system 10 which powers, controls, and provides supplies to a welding operation. The welding system 10 includes a welder 12 having a control panel 14 through which a welding operator may control the supply of welding materials, such as gas flow, wire feed, and so forth, to a spool gun 16. The control panel 14 includes a first knob 18 (or other input device) that the operator may use to adjust the voltage or input a material thickness. The panel 14 also includes a second knob 20 that may be adjusted to manually set a wire feed speed or to place the welder in an auto-set mode. That is, the operator may place the welder 12 in an auto-set mode such that a controller determines an appropriate coarse wire feed speed for the given welding operation based on the input wire diameter. When the operator places the welder 12 in the auto-set mode, the wire feed speed may be fine tuned via a potentiometer 22 (or other input device) located on the spool gun 16.

The welder 12 may also include a tray 24 mounted on a back of the welder 12 and configured to support a gas cylinder 26 held in place with a chain 28. The gas cylinder 26 may be the source of gas that supplies the spool gun 16. To that end, a gas hose 30 may couple the gas cylinder 26 to the spool gun 16. The spool gun 16 may also couple to the welder 12 via a weld cable 32 and a gun trigger plug 34. The welder 12 may also be portable via a set of smaller front wheels 36 and a set of larger back wheels 38, which enable the operator to move the welding system 10 to the location of the weld.

It should be noted that modifications to the exemplary welding system 10 of FIG. 1 may be made in accordance with aspects of the present invention. For example, the tray 24 may be eliminated from the welder 12 and the gas cylinder 26 may be located on an auxiliary support cart or in a location remote from the welding operation. Furthermore, although the illustrated embodiments are described in the context of a constant voltage MIG welding process, the features of the invention may be utilized with any welding process or system that utilizes a spool gun. It should also be noted that, although reference is made in the present discussion to "knobs" or to "potentiometers" for adjustment of the wire feed speed, a range of other input devices may be envisaged, such as buttons, momentary contact switches, and so forth, that may interface with input and/or control circuitry to provide the coarse and fine adjustments discussed.

Figure 2:
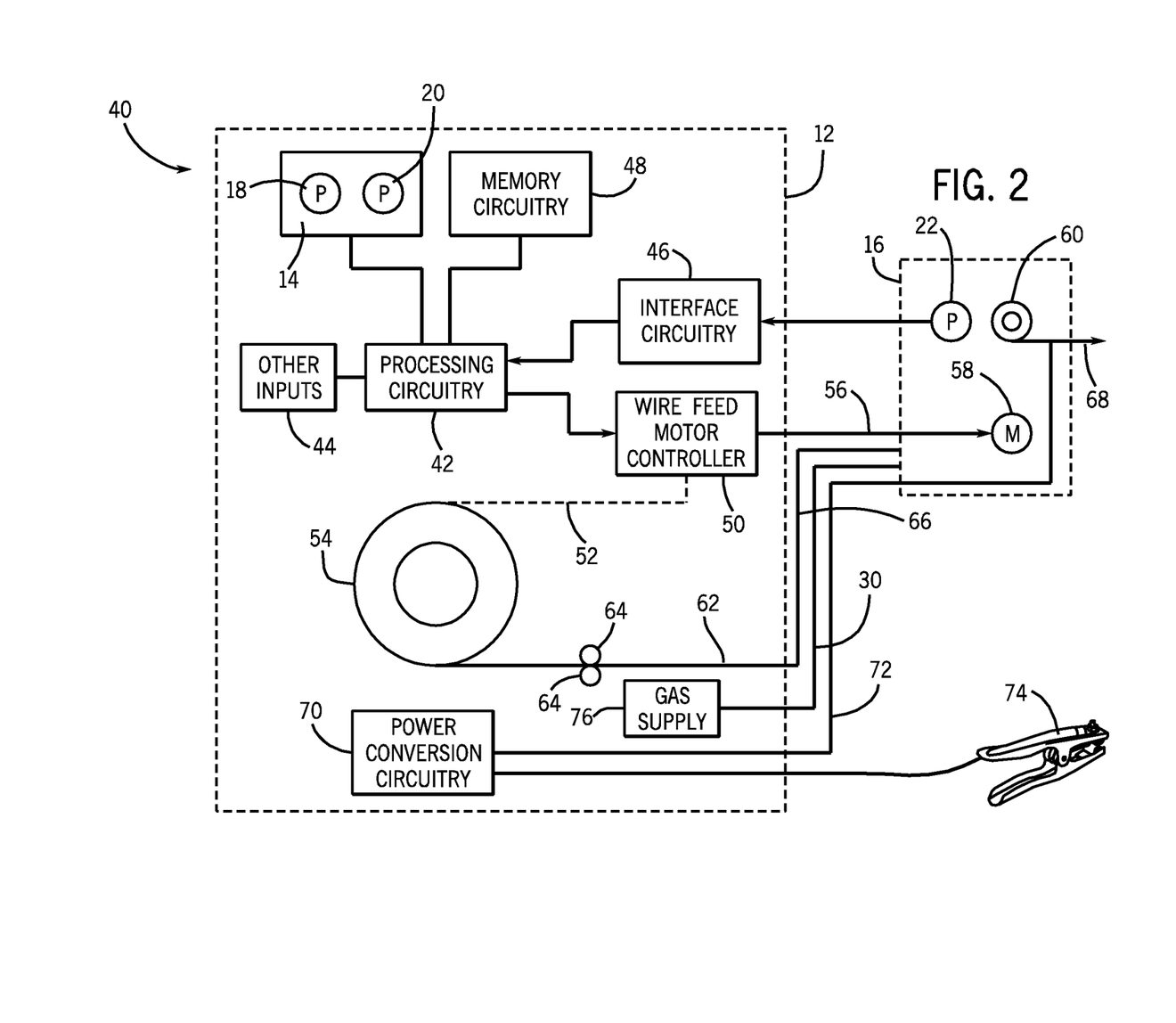
FIG. 2 is a block diagram illustrating exemplary components of the welder and the spool gun of FIG. 1.

FIG. 2 is a block diagram 40 further illustrating components of the welding system 10 of FIG. 1. The block diagram 40 illustrates components that may be located in the welder 12 as well as internal components of the spool gun 16. Specifically, the welder 12 may include the control panel 14 having the first potentiometer 18 and the second potentiometer 20 that may be adjusted to set the voltage/material thickness and the coarse wire feed speed, respectively. As the operator adjusts the potentiometers 18 and 20, signals encoding the input data are transmitted to processing circuitry 42. The processing circuitry 42 may also receive other inputs 44 (e.g., desired amperage, welding process type, etc.), which are processed with the inputs from the potentiometers 18 and 20. Additionally, the processing circuitry 42 may receive an input from interface circuitry 46 that communicates information from the spool gun 16 to the welder 12 regarding operation and inputs received via one or more potentiometers located on the spool gun 16.

The processing circuitry 42 is further associated with memory circuitry 48 which may be utilized by the processing circuitry 42 to store information for future retrieval. To that end the memory circuitry 48 may include volatile or non-volatile memory, such as read only memory (ROM), random access memory (RAM), magnetic storage memory, optical storage memory, or a combination thereof. Furthermore, a variety of control parameters may be stored in the memory along with code configured to provide a specific output to the user during operation (e.g., output signal guiding coarse wire feed speed for given inputs). Accordingly, the processing circuitry 42 may be adapted to receive a variety of inputs 14, 44, and 46, access the memory circuitry 48 to determine an appropriate output signal based on its inputs, and output the appropriate signal to a wire feed motor controller 50.

The wire feed motor controller 50 outputs a first signal 52 to a first wire spool 54 located in the welder 12 and a second signal 56 to a motor 58 for a second wire spool 60 located in the spool gun 16. In some embodiments, the first wire spool 54 may be adapted to supply steel wire and the second wire spool 60 may be adapted to supply aluminum wire. Furthermore, the first wire spool 54 may be substantially larger than the second wire spool 60, which is configured for use in the spool gun 16. The processing circuitry 42 may be further configured to selectively activate the correct wire spool for the desired welding operation. If the first wire spool 54 is activated, a first wire feed 62 is fed through a wire feed mechanism 64 to the spool gun 16 via a conduit 66. If the second wire spool 60 is activated, a second wire feed 68 is fed to the weld from the spool gun 16.

The welder 12 also includes power conversion circuitry 70 that is configured to receive incoming power (e.g., from the grid, an engine/generator, a battery, a fuel cell, etc., or combinations thereof) and to condition the incoming power to an appropriate output. The power conversion circuitry 70 provides conditioned power to the spool gun via cable 72. A ground clamp 74 extends from the power conversion circuitry 70 in the welder 12 to the location of the weld to complete the circuit between the power supply and the workpiece. Additionally, the welder 12 may include a gas supply 76 that supplies gas to the spool gun 16 via cable 30.

Figure 3:
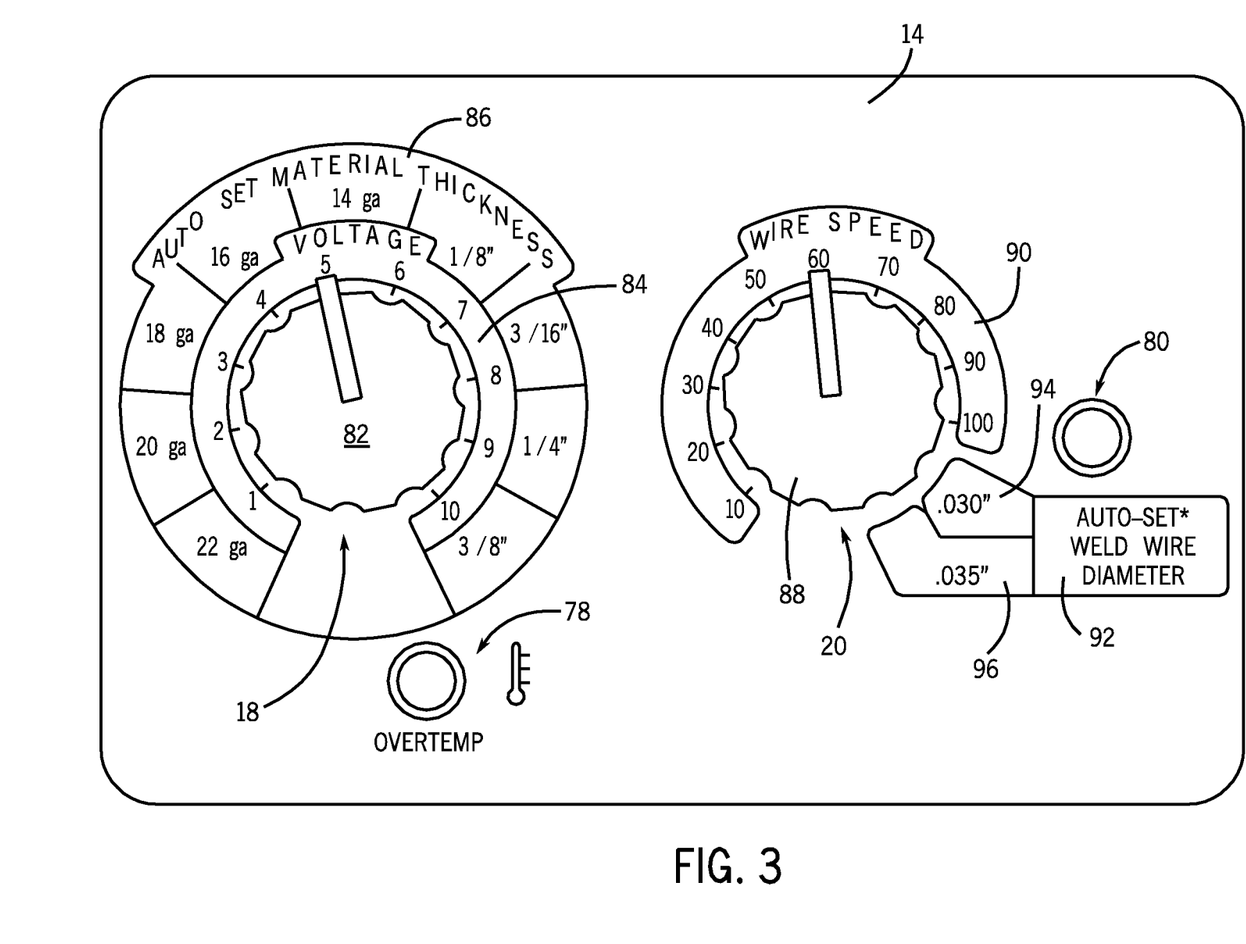
FIG. 3 illustrates an exemplary control panel that may be located on a welder in accordance with aspects of the present invention.

FIG. 3 illustrates an exemplary control panel 14 that may be located on the welder 12 in some embodiments. The control panel 14 includes the first potentiometer 18, the second potentiometer 20, a temperature indicator 78, and an auto-set indicator 80. The first potentiometer 18 includes a knob 82, a voltage panel 84, and a material thickness panel 86. The second potentiometer 20 includes a knob 88, a wire speed panel 90, and an auto-set wire diameter panel 92. Taken together, the components of the control panel 14 facilitate the adjustment of a variety of weld parameters.

During use, the first potentiometer 18 allows the operator to control the voltage of the welding process during manual operation and set the material thickness during auto-set mode. Specifically, to adjust the voltage of the welding process during manual welding, the operator may turn the knob 82 clockwise around the voltage panel 84 to increase the weld voltage level and counterclockwise to decrease the weld voltage level. When in auto-set mode, the operator may rotate the knob 82 clockwise around the auto-set material thickness panel 86 from 22 gage to ⅜" to the applicable material thickness. After the user has rotated the knob 82 to the appropriate material thickness, the welder 12 will output an appropriate coarse voltage within the range of the selected material thickness and the weld wire diameter, as discussed in more detail below.

The second potentiometer 20 allows the operator to control the wire feed speed during manual operation and to place the welder 12 in auto-set mode when desired. For example, during manual operation, the operator may turn the knob 88 counterclockwise from 10 to 100 to increase the wire feed speed and clockwise from 100 to 10 to decrease the wire feed speed. To place the welder 12 in auto-set mode, the user may rotate the knob 88 to a first subpanel 94 or a second subpanel 96 of the auto-set wire diameter panel 92. After turning the knob to the auto-set wire diameter panel 92, the auto-set indicator 80 illuminates, and the welder 12 provides an appropriate coarse wire feed speed for the wire diameter selected via the second potentiometer 20 and the material thickness selected via the first potentiometer 18. If the welder 12 overheats at any point during operation, the temperature indicator 78 illuminates and output ceases. In this way, the first potentiometer 18 and the second potentiometer 20 cooperatively function to allow the user to place the welder 12 in auto-set mode, input the applicable wire diameter, and set the appropriate material thickness. The welder 12 uses such inputs to output an appropriate voltage and a coarse wire feed speed for the given welding operation.

It should be noted that where an auto-set mode is available, this is a particularly convenient mechanism for determining and setting the coarse (or base) wire feed speed. However, some welders will not be equipped with such automatic wire feed speed determination. Those welders may nevertheless benefit from aspects of the techniques described herein. That is, a coarse (or base) wire feed speed may be set manually and a fine adjustment made above or below this coarse setting as described below. In practice, the manual setting may be input via a potentiometer input device, a keypad, or any other suitable interface.

Figure 4:
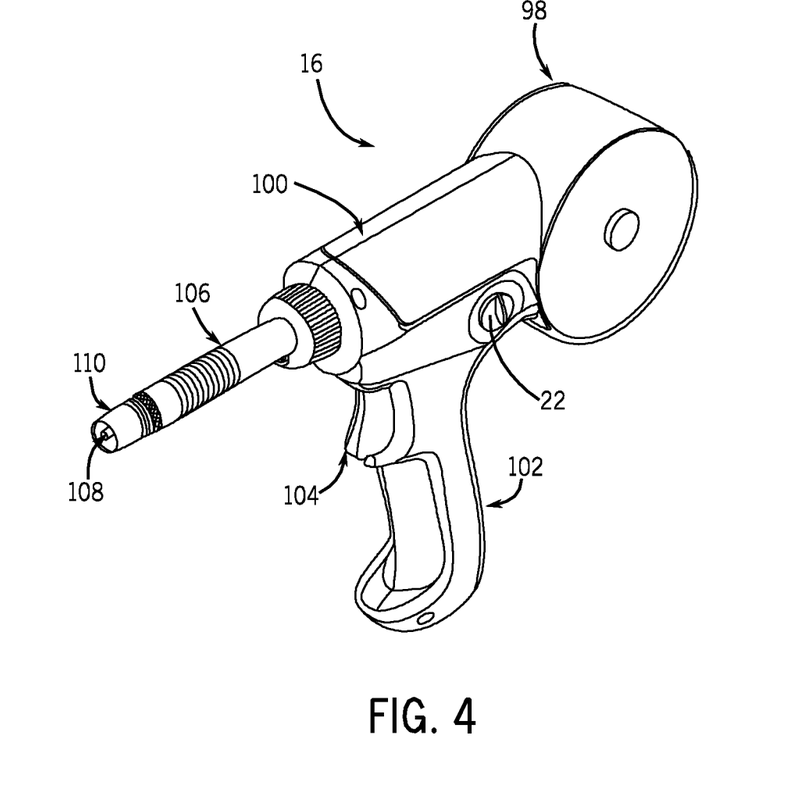
FIG. 4 is a perspective view of an exemplary spool gun with a fine adjustment in accordance with aspects of the present invention.

FIG. 4 illustrates the spool gun 16 of FIG. 1 in more detail. The spool gun 16 includes a first outer shell 98 that houses a wire spool and a second outer shell 100 that houses other internal components of the spool gun 16, such as an inlet guide, a roll assembly, and so forth. In some embodiments, the outer shell 98 may house an aluminum wire spool. The spool gun 16 also includes a handle 102 with a trigger 104. During operation, a user may press the trigger 104 to start shielding gas flow and begin a wire feed. The wire feed exits the spool gun 16 via a barrel 106 and a contact tip 108 encased in a nozzle 110.

The spool gun 16 also includes an input device, such as the potentiometer 22 discussed above. In some embodiments, the potentiometer 22 may be associated with a fine tuning knob that the operator may adjust to fine tune the coarse wire feed speed set by the welder 12 when the auto-set mode is chosen (or when the coarse setting is manually input). That is, in auto-set mode, the coarse wire feed speed may be automatically set by the welder 12 when the user chooses the auto-set weld wire diameter option on the control panel 14. However, the user may then manually fine tune the wire feed speed by turning the potentiometer 22 located on the spool gun 16. In one embodiment, the fine tuning of the wire feed speed may allow the operator to adjust the wire feed speed between approximately 180-220 inches per minute, although any range may be used. Moreover, the fine tuning may simply adjust the wire feed speed within a range somewhat above and/or somewhat below whatever coarse adjustment is set.

Figure 5:
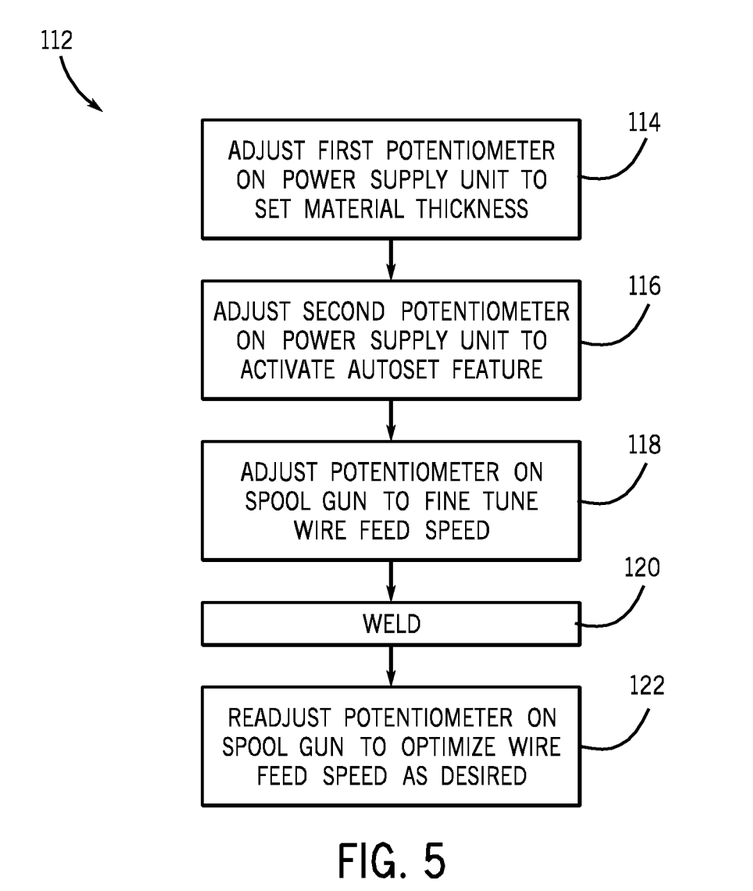
FIG. 5 is an exemplary method of operating the welding system of FIG. 1 to set a wire feed speed in accordance with aspects of the present invention.

FIG. 5 illustrates an exemplary method 112 of operating the illustrated spool gun 16 in conjunction with the illustrated control panel 14. The method 112 includes adjusting the first potentiometer on the welder to set the material thickness for the given welding operation (block 114). The method 112 also includes adjusting the second potentiometer on the welder to activate the auto-set feature for the appropriate weld wire diameter (block 116). That is, the user may adjust the first potentiometer and the second potentiometer to manually input the material thickness and weld wire diameter for the given welding process, and the welder will automatically output the appropriate voltage and coarse wire feed speed based on such inputs. The method 112 also includes adjusting the potentiometer on the spool gun to fine tune the wire feed speed (block 118). The method 112 includes a welding step (block 120) during which the user may test the wire feed speed setting. If the wire feed speed is appropriate for the welding operation, the user may continue welding. If the wire feed speed needs further adjustment, the user may readjust the potentiometer on the spool gun to further fine tune the wire feed speed (block 122). That is, the user may fine tune the wire feed speed proximate to the weld without having to return to the welder to adjust a knob.

Figure 6:
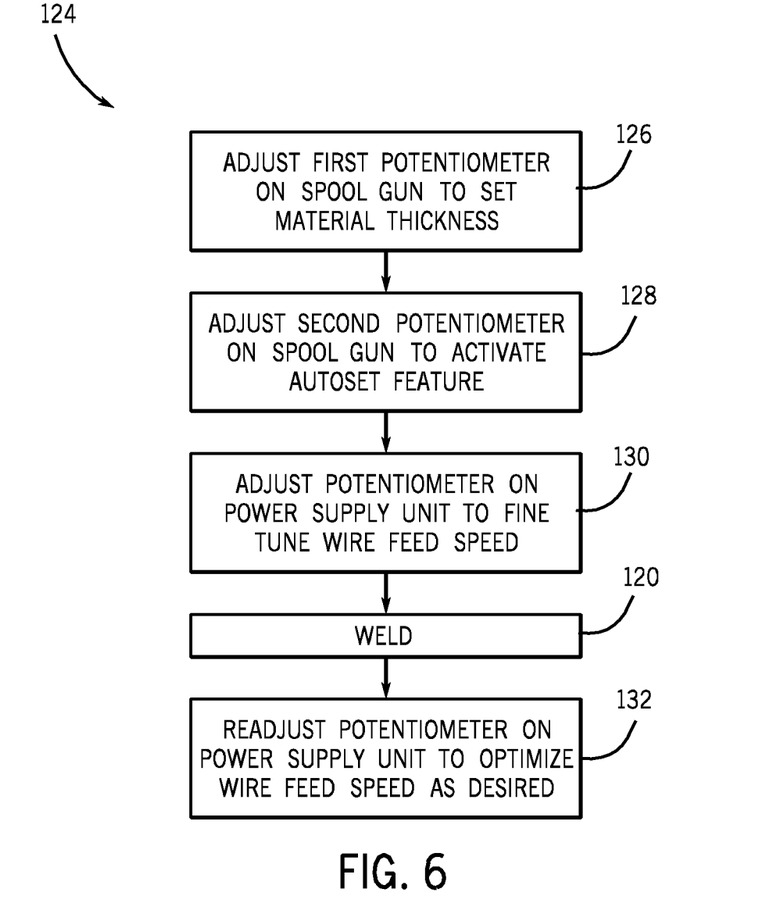
FIG. 6 is an exemplary method of operating a welder in conjunction with a spool gun to set a wire feed speed in accordance with aspects of the present invention.

FIG. 6 illustrates an alternate method 124 of operating an embodiment of the present invention in which the locations of the potentiometers of the welder and the spool gun are interchanged with respect to the embodiment of FIG. 1. That is, the potentiometers 18 and 20 may be located on the spool gun 16 and the potentiometer 22 may be located on the welder 12. In this embodiment, the method 124 includes adjusting the first potentiometer on the spool gun to set the material thickness for the welding application (block 126). The method 124 also includes adjusting the second potentiometer on the spool gun to activate the auto-set feature and set the wire diameter (block 128). That is, the material thickness and the wire diameter are set on the spool gun in this embodiment. The method 124 further includes adjusting the potentiometer on the welder to fine tune the wire feed speed (block 130). Whereas in the embodiment of FIG. 5, the weld wire feed speed was fine tuned via a knob on the spool gun, in the embodiment of FIG. 6, the fine tuning of the wire speed is controlled via a knob on the welder. The method 124 also includes the welding step (block 120) and readjustment of the potentiometer on the welder to optimize the fine tuning of the wire feed speed if desired (block 132).

As will be appreciated by those skilled in the art, a similar method is employed when the welder does not have an auto-set feature. That is, the welding operator may set a coarse adjustment, such as by an input device on the welder or power supply. Thereafter, a fine adjustment (e.g., slightly above, slightly below, or both) with respect to this coarse adjustment may be made on the spool gun (or vice versa) as described.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply comprising:
    a control panel comprising:
        a first input element configured to receive an input relating to a material thickness;
        a second input element configured to receive a first input to place the welding power supply in a first mode of operation, wherein the first input relates to a wire diameter; and
    control circuitry configured to place the welding power supply in the first mode of operation when the first input is received from the second input element, to determine a coarse wire feed speed when the welding power supply is in the first mode of operation, to receive an input to fine tune the coarse wire feed speed, and to fine tune the coarse wire feed speed based on the received input to fine tune the coarse wire feed speed.

2. The welding power supply of claim 1, wherein the control circuitry is configured to control a motor associated with a wire spool to feed wire from the wire spool to a welding operation at the fine tuned coarse wire feed speed.

3. The welding power supply of claim 1, wherein the control circuitry, when in the first mode of operation, is configured to determine the coarse wire feed speed based at least in part on the first input relating to the wire diameter to be used in a welding operation received from the second input element and the input relating to the material thickness received from the first input element.

4. The welding power supply of claim 1, wherein the second input element is configured to alternatively receive a second input to place the welding power supply in a second mode of operation.

5. The welding power supply of claim 4, wherein the control circuitry, when in the second mode of operation, is configured to determine the coarse wire feed speed based at least in part on an input relating to wire feed speed received from the second input element and an input relating to a weld voltage level received from the first input element.

6. The welding power supply of claim 1, comprising a first wire spool configured to supply a first wire.

7. The welding power supply of claim 6, wherein the control circuitry receives the input to fine tune the coarse wire feed speed from a spool gun configured to supply a second wire from a second wire spool disposed therein.

8. The welding power supply of claim 7, wherein the first wire is steel wire and the second wire is aluminum wire.

9. The welding power supply of claim 7, wherein the control circuitry is configured to selectively activate one of the first wire spool or the second wire spool for a welding operation.

10. The welding power supply of claim 9, wherein the first wire is supplied to the spool gun via a conduit disposed between the welding power supply and the spool gun when the first wire spool is activated.

11. The welding power supply of claim 1, wherein the second input element is configured to receive an input relating to a wire feed speed when the welding power supply is in a second mode of operation.

12. A welding power supply comprising:
    a control panel comprising:
        a first input element configured to receive an input relating to a material thickness;
        a second input element configured to receive a first input to place the welding power supply in a first mode of operation; and
    control circuitry configured to place the welding power supply in the first mode of operation when the first input is received from the second input element, to determine a coarse wire feed speed when the welding power supply is in the first mode of operation, to receive an input to fine tune the coarse wire feed speed, and to fine tune the coarse wire feed speed based on the received input to fine tune the coarse wire feed speed, wherein the control circuitry, when in the first mode of operation, is configured to determine the coarse wire feed speed based at least in part on an input relating to a diameter of a wire to be used in a welding operation received from the second input element and the input relating to the material thickness received from the first input element.

13. The welding power supply of claim 12, wherein the control circuitry is configured to control a motor associated with a wire spool to feed wire from the wire spool to a welding operation at the fine tuned coarse wire feed speed.

14. The welding power supply of claim 12, wherein the second input element is configured to alternatively receive a second input to place the welding power supply in a second mode of operation.

15. The welding power supply of claim 14, wherein the control circuitry, when in the second mode of operation, is configured to determine the coarse wire feed speed based at least in part on an input relating to wire feed speed received from the second input element and an input relating to a weld voltage level received from the first input element.

16. The welding power supply of claim 12, wherein the second input element is configured to receive an input relating to a wire feed speed when the welding power supply is in a second mode of operation.

17. A welding power supply comprising:
    a control panel comprising:
        a first input element configured to receive an input relating to a material thickness;
        a second input element configured to receive a first input to place the welding power supply in a first mode of operation, and to alternatively receive a second input to place the welding power supply in a second mode of operation; and
    control circuitry configured to place the welding power supply in the first mode of operation when the first input is received from the second input element, to determine a coarse wire feed speed when the welding power supply is in the first mode of operation, to receive an input to fine tune the coarse wire feed speed, and to fine tune the coarse wire feed speed based on the received input to fine tune the coarse wire feed speed, wherein the control circuitry, when in the second mode of operation, is configured to determine the coarse wire feed speed based at least in part on an input relating to wire feed speed received from the second input element and an input relating to a weld voltage level received from the first input element.

18. The welding power supply of claim 17, wherein the control circuitry is configured to control a motor associated with a wire spool to feed wire from the wire spool to a welding operation at the fine tuned coarse wire feed speed.

19. The welding power supply of claim 17, wherein the control circuitry, when in the first mode of operation, is configured to determine the coarse wire feed speed based at least in part on an input relating to a diameter of a wire to be used in a welding operation received from the second input element and the input relating to the material thickness received from the first input element.

20. The welding power supply of claim 17, wherein the second input element is configured to receive an input relating to a wire diameter when the welding power supply is in the first mode of operation.

* * * * *